UNITED STATES PATENT OFFICE.

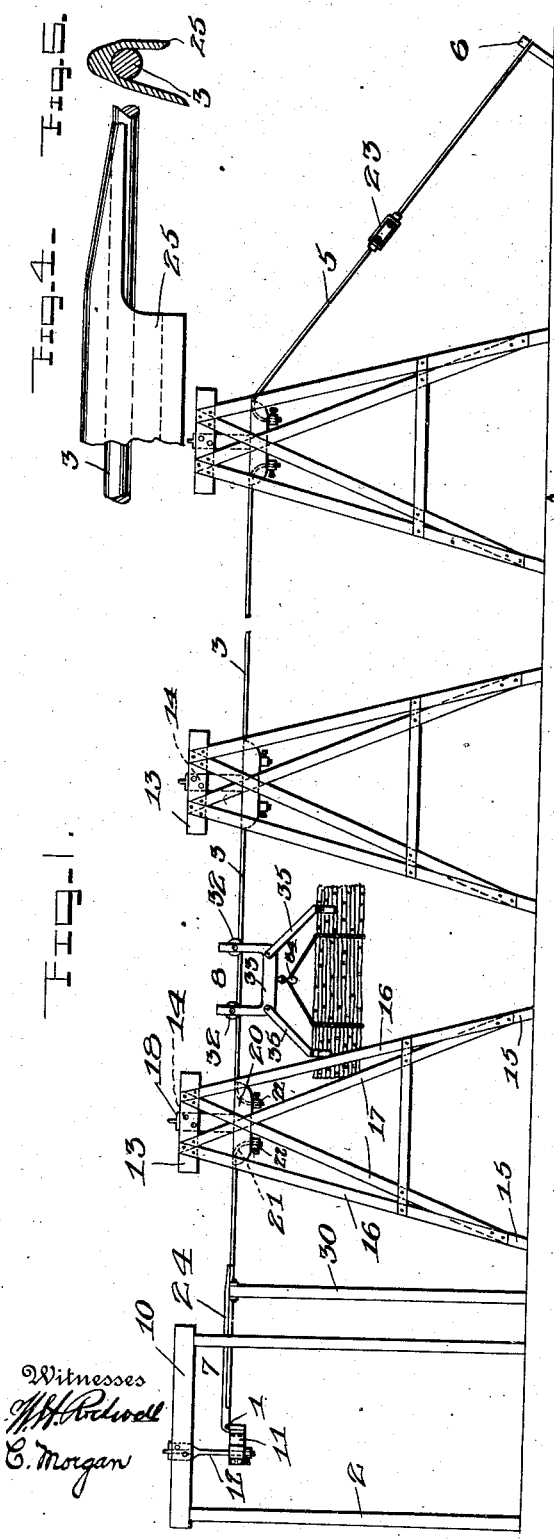

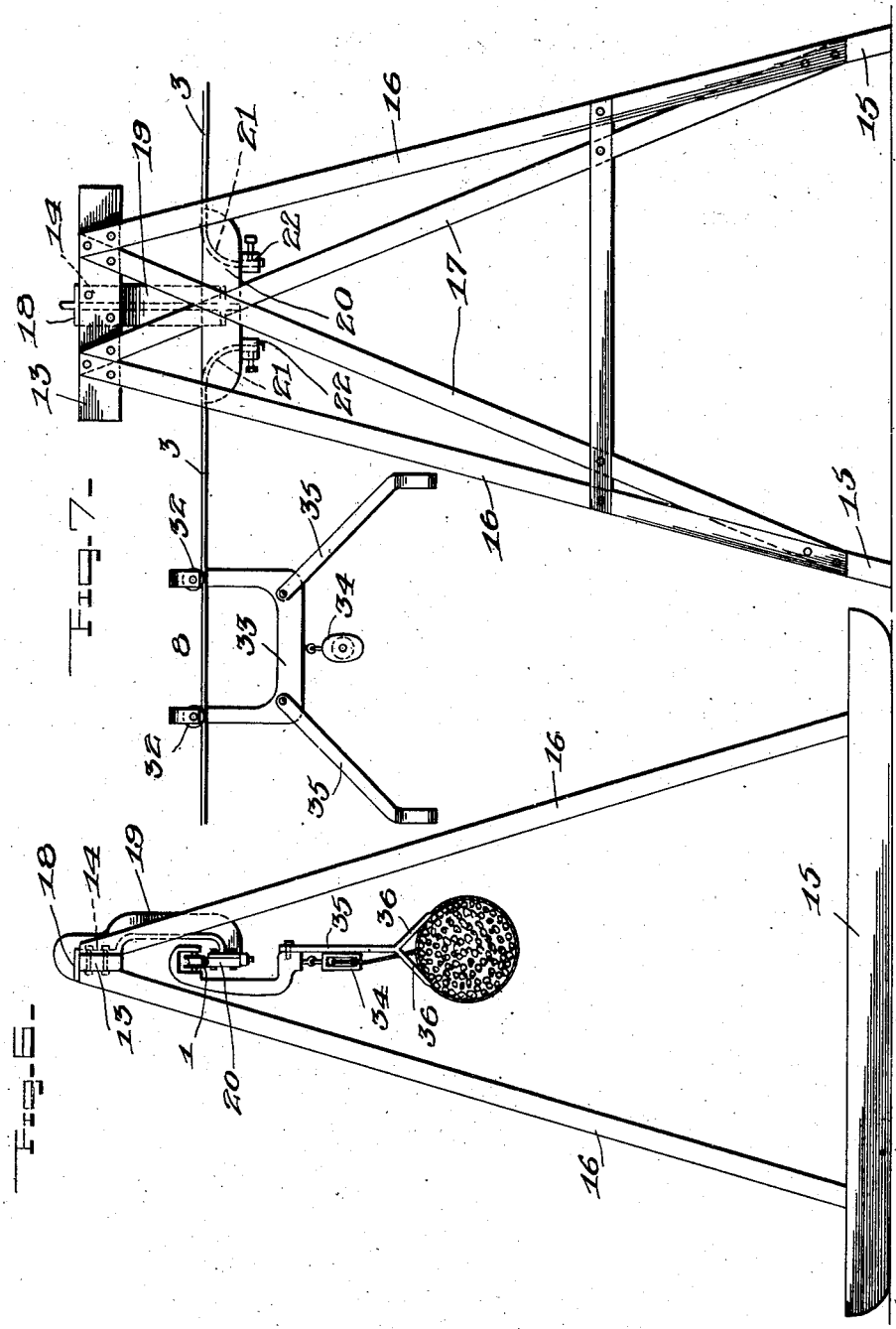

JAMES STUART WILKINS, OF PRESTON, CUBA.

TRANSPORTATION SYSTEM.

973,834.  Specification of Letters Patent.  Patented Oct. 25, 1910.

Application filed July 25, 1910. Serial No. 573,606.

*To all whom it may concern:*

Be it known that I, JAMES S. WILKINS, a citizen of the United States, residing at Preston, in the Island of Cuba, have invented new and useful Improvements in Transportation Systems, of which the following is a specification.

This invention relates to an improved conveying system, and more particularly to a portable over head system for conveying cut produce from the field where it grows to a central station.

The object of this invention is to provide a means which may be placed in a field of produce which is portable and may be systematically moved from place to place, so that the cut produce may be conveyed from the ground where it grows and assembled at a central station with but little actual handling of the produce.

In carrying out this invention, it has been found to be most advantageous to establish a main line or over head cable way and temporary portable over head branch cable-ways leading therefrom, which may be readily changed or moved as the circumstances require.

This invention is of particular advantage for the transportation of cut sugar cane. The particular portable form of stand for the over head cable-ways and the portable switch by which the branch cable-ways are connected with the main cable-way allow the branch cable-ways to be moved from place to place for transporting bundles of the sugar cane directly from where they are cut to the main station with but one handling.

While the preferred form of this invention is illustrated upon the accompanying sheets of drawing, yet it is to be understood that minor detail changes may be made without departing from the scope thereof.

Figure 1 illustrates the application of this invention, showing one of the branch cable-ways in side elevation and the main cable-way in end elevation. Fig. 2 is a diagrammatical plan view, showing the main cable-way with several branch cable-ways leading therefrom. Fig. 3 is a top plan view of the portable switch connecting a branch cable-way with the main cable-way. Fig. 4 is an enlarged detail view in side elevation of the free end of the switch illustrated in Fig. 3. Fig. 5 is a view in transverse section taken through Fig. 4. Fig. 6 is a view in end elevation of one of the portable standards supporting a branch cable-way. Fig. 7 is a view in side elevation of Fig. 6, illustrating a part of the cable-way and carrier.

A main cable-way 1 leading from the station or store house extends through the center of the field of growing cane or to one side thereof as desired. This main cable-way may be supported either from fixed or portable frames 2. When the cane is cut, branch lines 3 are placed in the field leading from one side or both sides of the main cable-way as desired. These branch lines are supported upon portable standards 4 and the outermost stand is braced by a tension rod or guy 5 secured to a post 6 driven into the ground. The ends of the branch line adjacent the main cable-way is provided with a hinged switch 7 by which the carriers 8 passing over the branch line may be conducted onto the main line.

The main cable-way 1 is supported upon a bracket 9 secured to a transverse beam 10 supported upon posts. The cable proper is supported upon and attached to a horizontal arm 11 detachably and adjustably mounted upon a vertical arm 12 of the bracket which extends upward along one side of and over the top of these supporting transverse beams 10, and is secured to the sides thereof at one side of the center line, so that the cable will be centrally suspended between the supporting posts.

The portable stands 4 for supporting the branch lines as clearly illustrated in Figs. 6 and 7 are formed with a longitudinal supporting beam 13 for the bracket 14 supporting the over head cable. On each side of this supporting beam and near each end thereof are secured a plurality of angularly disposed braces, the bottoms of which are secured to transverse bases 15 adapted to rest upon the ground. These bases 15 are arranged transversely to the longitudinally supporting beam 13 and the distances between them is considerably greater than the distance between the points of attachment of the braces upon the supporting beam. The angularly disposed brace 16 from each end of the supporting beam is rigidly secured to the base member 15 upon the corresponding side, and the corresponding braces on the opposite side are secured in the same manner with their lower extremities arranged a considerable distance one each side of the center line of the base. On each side of the longitudinal supporting beam 13 a brace 17 extends from one end thereof to the opposite base member 15 and is secured thereto or to the brace 16 leading from the other end to the base member. This provides a support or framework which may be readily moved from place to place and at the same time will afford a strong substantial and stable means for supporting the branch cable-ways.

Centrally mounted upon each longitudinal supporting beam between the side braces is a cable supporting bracket 14, which is secured to one side of the beam and is provided with an upper member 18 extending over and resting upon the top of the supporting beam and with an off-set depending member 19 which supports a cable securing means directly beneath and parallel with the center line of the longitudinal supporting beam 13.

It has been found most advantageous to place each of the portable supports a definite distance apart, in order that the cableway may be sufficiently supported at the points between the portable supports to carry the load properly, and for this reason separate lengths of cable are used between each portable support.

The longitudinal member 20 of the cable supporting bracket 14 is provided with a longitudinal cable securing means which extends on each side of the depending bracket 19, and is provided with an upper portion corresponding to the cable so that a carrier may readily pass thereover. Each end of this member 20 is provided with an internal curved slot 21 extending from the outer end of the bottom of this member, and each end of the length of cable between the portable support is passed through the curved slot on the corresponding side of the cable securing member 20 and its end is firmly secured on the under side of the member by any desired means, such as a clamp 22 as here shown. The tension rod or guy 5 upon the outermost portable frame may be of the same cable as used in the cable way and is preferably secured in the same manner as one end of a cable length to the portable support, and the other end fastened to a stake driven into the ground. It is preferable to insert a turn buckle 23 in this guy in order that proper tension may be placed upon the branch cable-way.

A pivoted switch 7 is attached to the branch cable-way at the end adjacent the main cable-way and this switch is preferably constructed in the following manner. The switch member 24 is preferably curved in an arc of a quarter circle and is provided with a central outstanding flange upon the outer surface of curvature. The end 25 adjacent the main cable-way is slotted upon the under side and is adapted to lie over and engage each side of the main cable, as shown in Figs. 4 and 5. The opposite end is provided with means 26 for attachment to the adjacent branch cable-way. Two outstanding ears 27 are provided on the outer side of the switch at this end which are adapted to be pivotally secured by a bolt passing through corresponding outstanding ears 28 upon a bracket 29 carried upon a post 30. The outstanding flange is preferably provided with an extending arm 31 of sufficient length to rest upon the upper surface of the main cable. When the switch is in the operative position, as shown in Figs. 1 and 3, the free ends rest upon the main cable and the extending arm resting upon the main cable adds additional support to the medial portion of the switch. When it is desired to pass a carrier under this switch it may be readily rotated about its pivotal point to allow of the passage of a carrier thereunder.

The carrier 8 is preferably provided with two wheels 32 spaced apart upon a frame 33 depending therefrom as shown in Figs. 6 and 7. A block and tackle 34 is centrally carried on the under side of this frame for lifting the load to be carried thereby. To prevent the load from swinging on a horizontal axis and thereby engaging the supporting braces of the portable frames, and more particularly in the case of cut sugar cane where each bundle is of considerable length, a forked member 35 is pivotally secured to each end of the carrier frame, so that as the load is drawn upward toward the frame the lower forked extremities 36 will engage the load on each side of the longitudinal center line and thereby keep it in place during its travel.

What I claim is:—

1. In a system of transportation, an over head main cable-way, and one or more branches leading therefrom suspended from portable supports and connected thereto by a portable hinged switch.

2. In a system of transportation, an over head main cable-way, one or more detachable branches leading therefrom suspended from portable supports having angular depending braces on each side of the cableway and a carrier provided with forked load positioning members directing the load between the angular disposed supports.

3. In a system of transportation, an over head main cable-way, and one or more branch cable-ways detachably connected thereto and suspended by brackets from a supporting beam between side braces carried upon transverse bases of portable supporting frames.

4. In a system of transportation, an over head main cable-way, and a plurality of branch cable-ways leading therefrom, each branch comprising a plurality of detached cable lengths and a corresponding number of portable supports having securing means for the ends of the cable lengths, a hinged switch engaging the main line and secured to the free end of the adjacent cable lengths, a portable support for said switch and a tension brace for the outermost portable cable support.

5. In a system of transportation, an over head main cable-way, and a plurality of branch cable-ways including a portable cable supporting frame comprising a longitudinal supporting beam, a cable suspending bracket secured thereto, spaced apart transverse bases at each end of the supporting beam, and angularly disposed braces on each side of the beam leading from each end thereof to each brace.

6. In a system of transportation, an over head main cable-way, and a plurality of branch cable-ways including a curved switch having one end adapted to embrace and rest upon the main cable-way, a branch cable securing means and a hinge member upon the other end, and a radial arm extending from the outer curved surface adapted to rest upon the main cable-way, a portable switch support, a switch supporting bracket carried thereon having a hinge member pivotally engaging the hinge member upon the switch.

JAMES STUART WILKINS.

Witnesses:
E. E Durant,
H. Ess. Green.